United States Patent
Hochman

(10) Patent No.: US 10,007,144 B1
(45) Date of Patent: Jun. 26, 2018

(54) SEGMENTED TRANSPARENT LCD WITH LOCALIZED BACKLIGHTING

(71) Applicant: Revolution Display, LLC, Glendale, CA (US)

(72) Inventor: Jeremy Hochman, Walnut, CA (US)

(73) Assignee: Revolution Display, LLC, Glendale, CA (US)

( * ) Notice: Subject to any disclaimer, the term of this patent is extended or adjusted under 35 U.S.C. 154(b) by 111 days.

(21) Appl. No.: 15/005,694

(22) Filed: Jan. 25, 2016

Related U.S. Application Data

(60) Provisional application No. 62/107,431, filed on Jan. 25, 2015.

(51) Int. Cl.
  *G02F 1/1335* (2006.01)

(52) U.S. Cl.
  CPC ...... *G02F 1/1336* (2013.01); *G02F 1/133502* (2013.01); *G02F 1/133528* (2013.01); *G02F 1/133553* (2013.01); *G02F 2001/133618* (2013.01)

(58) Field of Classification Search
  CPC ............. G02F 1/1336; G02F 1/133502; G02F 1/133528; G02F 1/133553; G02F 1/13336; G02F 2001/133618; G09F 9/35
  See application file for complete search history.

(56) References Cited

U.S. PATENT DOCUMENTS

| | | | |
|---|---|---|---|
| 4,630,893 A | 12/1986 | Credelle et al. | |
| 6,040,936 A | 3/2000 | Kim et al. | |
| 7,259,815 B2 | 8/2007 | Yang et al. | |
| 2006/0092355 A1* | 5/2006 | Yang | G02F 1/133555 349/114 |
| 2011/0279755 A1* | 11/2011 | Nittou | A63F 13/08 349/77 |
| 2013/0050149 A1 | 2/2013 | Rattray et al. | |
| 2013/0271674 A1* | 10/2013 | Liu | G02F 1/133621 349/12 |
| 2014/0204023 A1 | 7/2014 | Kumar et al. | |
| 2014/0204318 A1 | 7/2014 | Kang et al. | |
| 2014/0268879 A1 | 9/2014 | Mizuyama et al. | |

FOREIGN PATENT DOCUMENTS

| | | |
|---|---|---|
| EP | 2787384 A1 | 10/2014 |
| WO | 2007030447 A2 | 3/2007 |

OTHER PUBLICATIONS

German Flat Panel Display Forum, PowerPoint Presentation, 3M Automotive Display Solution, 3M, Dec. 9, 2008.

* cited by examiner

*Primary Examiner* — Nathanael R Briggs
(74) *Attorney, Agent, or Firm* — Downs Rachlin Martin PLLC

(57) ABSTRACT

A segmented transparent LCD is disclosed that includes a LC module that is substantially transparent to visible light. The segmented transparent LCD includes an array of spaced apart display segments supported by the LCD module. Each display segment is configured to display a segment of the display image. Each display segment includes a non-specular light-redirecting segment configured to provide localized backlight to the display segment when the ambient light is incident thereon. The segmented transparent LCD allows for a display image to be displayed and viewed while also allowing a viewer to see through one or more transparent regions that separate the display segments. Methods of displaying a display image using the segmented transparent LCD are also disclosed.

30 Claims, 13 Drawing Sheets

SEGMENTED TRANSPARENT LCD WITH LOCALIZED BACKLIGHTING

RELATED APPLICATION DATA

This application claims the benefit of priority of U.S. Provisional Patent Application Ser. No. 62/107,431, filed Jan. 25, 2015, and titled "Segmented Transparent LCD With Localized Backlighting," which is incorporated by reference herein in its entirety.

FIELD OF THE INVENTION

The present disclosure relates to displays, and in particular relates to liquid-crystal displays (LCDs), and more particularly relates to a segmented transparent LCD with localized backlighting.

The entire disclosure of any publication or patent document mentioned herein is incorporated by reference.

BACKGROUND

An LCD utilizes a twisted nematic liquid-crystal (LC) material supported in a liquid-crystal (LC) module or panel. The LC module includes two glass substrates that sandwich the LC material. Each of the two glass substrates includes transparent electrodes that are used to electrically address locations (image pixels) of the LC module. Two sheets of polarizers sandwich the two glass substrates of the LC module. The two sheets of polarizers are arranged to be cross-polarized. For a reflective LCD that relies on ambient light for its illumination, the LCD includes a reflective surface on the backside of the rear polarizer.

When an image pixel is in the off state, there is no electric field applied to the LC material therein via the transparent electrodes, and the LC material of the image pixel rotates the polarization of light passing therethrough by 90 degrees so that it is transmitted through the LC module and the polarizers. In the on state, the LC material at the image pixel is adjusted, depending on the applied voltage, to vary the rotation of the polarization of the light passing through the LC material from 0 degrees (maximum voltage) to 90 degrees (no voltage). The transmission of the light through the LC module and the polarizers at a given image pixel is therefore determined by the amount of voltage applied by the transparent electrodes. In this configuration, the LCD is transparent in the off state.

Transparent LCDs are difficult to backlight properly, especially when the LCD relies on reflected ambient light for backlighting. A bright light source directly in the line of sight, equal to or larger than the size of the LCD and within a few feet of the LCD, is required for optimum performance. For the best overall viewing experience, the reflective surface that provides the backlighting from the ambient light generally needs to be highly reflective. Present-day LCDs thus work much like a one-way mirror and do not actually have a high degree of transparency, with the most transparent LCDs being about a 16% transparent.

SUMMARY OF THE DISCLOSURE

Aspects of the disclosure are directed to a segmented transparent LCD that includes a LC module, which is substantially transparent to visible light. The segmented transparent LCD includes an array of spaced apart display segments supported by the LCD module. Each display segment is configured to display either a segment of a larger display image, or its own display image. Each display segment includes a non-specular light-redirecting segment configured to provide localized backlight to the display segment when the ambient light is incident thereon. The segmented transparent LCD allows for a display image to be displayed and viewed while also allowing a viewer to see through one or more transparent regions that separate the display segments. Aspects of the disclosure include methods of displaying a display image or multiple display images or a portion of a display image.

An aspect of the disclosure is a segmented transparent LCD that employs ambient light for displaying a display image. The segmented transparent LCD includes: an LC module having front and rear sides and being substantially transparent to visible light; and an array of spaced apart display segments supported by the LC module, with each display segment configured to display a segment of the display image and having a non-specular light-redirecting segment configured to provide localized backlight to the display segment when the ambient light is incident thereon.

Another aspect of the disclosure is the segmented transparent LCD described above, wherein each display segment has a dimension in the range from 1 mm to 50 mm.

Another aspect of the disclosure is the segmented transparent LCD described above, wherein the display segments all have substantially the same dimensions.

Another aspect of the disclosure is the segmented transparent LCD described above, wherein the LC module defines image pixels, and wherein each display segment includes between 64 image pixels and 16,000 image pixels.

Another aspect of the disclosure is the segmented transparent LCD described above, wherein the non-specular light-redirecting segment includes at least one of surface light-redirecting features and internal light-redirecting features.

Another aspect of the disclosure is the segmented transparent LCD described above, wherein the surface light-redirecting features are defined by an amount of surface roughness.

Another aspect of the disclosure is the segmented transparent LCD described above, wherein the display segments each includes a light-reflecting segment cooperatively arranged with the non-specular light-redirecting segment.

Another aspect of the disclosure is the segmented transparent LCD described above, wherein the display segments are substantially uniformly spaced apart.

Another aspect of the disclosure is the segmented transparent LCD described above, wherein the display segments have a rectangular shape.

Another aspect of the disclosure is a segmented transparent LCD that employs ambient light and that includes: a LC module having front and rear sides and being substantially transparent to visible light; and an array of spaced apart display segments supported by the LC module, wherein each display segment includes: aligned front-side and rear-side polarizer segments respectively disposed on the front side and rear side of the LC module; and a light-redirecting segment adjacent the rear-side polarizer segment opposite the LC module, the light-redirecting segment configured to provide localized backlight to the display segment when the ambient light is incident thereon.

Another aspect of the disclosure is the segmented transparent LCD described above, wherein the display segments have substantially the same dimensions.

Another aspect of the disclosure is the segmented transparent LCD described above, wherein the LC module defines image pixels and wherein each display segment includes between 64 image pixels and 16,000 image pixels.

Another aspect of the disclosure is the segmented transparent LCD described above, wherein the light-redirecting segment includes at least one of surface light-redirecting features and internal light-redirecting features.

Another aspect of the disclosure is the segmented transparent LCD described above, wherein the surface light-redirecting features are defined by an amount of surface roughness.

Another aspect of the disclosure is the segmented transparent LCD described above, wherein the display segments each includes a light-reflecting segment on a backside of the light-redirecting segment.

Another aspect of the disclosure is the segmented transparent LCD described above, wherein the display segments are substantially uniformly spaced apart.

Another aspect of the disclosure is the segmented transparent LCD described above, wherein the light-redirecting segment is secured to the rear polarizer segment with an optically clear adhesive.

Another aspect of the disclosure is the segmented transparent LCD described above, wherein the display segments have a rectangular shape.

Another aspect of the disclosure is the segmented transparent LCD described above, wherein the display segments are formed as islands within a single contiguous transparent region.

Another aspect of the disclosure is a method of displaying a display image on a display. The method includes: a) providing a segmented LCD that includes a plurality of display segments separated by one or more transparent regions, wherein each of the display segments is configured to provide localized backlighting and to display a corresponding segment of the display image; b) illuminating the segmented transparent LCD with ambient light; and c) converting a portion of the ambient light into the localized backlighting in each of the display segments, thereby forming on each display segment the corresponding segment of a display image.

Another aspect of the disclosure is the method as described above, wherein the act of illuminating includes providing the ambient light from at least one off-axis direction with respect to the segmented transparent LCD.

Another aspect of the disclosure is the segmented transparent LCD described above, wherein each display segment includes a non-specular light-redirecting segment that non-specularly redirects the ambient light to form the localized backlighting.

Another aspect of the disclosure is the segmented transparent LCD described above, wherein the display segments have the same size.

Another aspect of the disclosure is the segmented transparent LCD described above, wherein the display segments are equally spaced apart from one another.

Another aspect of the disclosure is the segmented transparent LCD described above, further including viewing an object through the one or more transparent regions while viewing the segmented transparent LCD.

Another aspect of the disclosure is the segmented transparent LCD described above, wherein the display-image segments collectively form the entirety of the display image.

Another aspect of the disclosure is the segmented transparent LCD described above, wherein the display-image segments collectively form a portion of the entirety of the display image.

Another aspect of the disclosure is a method of manufacturing a segmented liquid crystal display (LCD) that employs ambient light for displaying a display image. The method includes obtaining an LCD display including a liquid crystal (LC) module and front and rear polarizers, the LCD display having a front side and a rear side; attaching a light-redirecting layer to a rear surface of the rear polarizer; attaching a protective film to a front surface of the front polarizer and a protective film to a rear surface of the light-redirecting layer; scoring the front and rear sides of the LCD display to form front and rear segments, the scoring on the front side extending though the front polarizer to a front side of the LC module and the scoring on the back side extending through the light-redirecting layer and the rear polarizer to a rear side of the LC module; and removing select ones of the front and rear segments to thereby form transparent spaces extending between remaining ones of the front and rear segments.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

In the discussion below, the term "transparent" in connection with the segmented transparent LCD disclosed herein refers to that portion of the display that is substantially transparent, and in particular refers to the one or more regions of the LCD display that reside between LCD segments, as described below.

Also in the discussion below, a "display image" formed by a segmented transparent LCD is displayed by display segments. In one example, each display segment displays a "segment" of the display image, e.g., the display segments collectively show only a portion of the display image, e.g., a portion of what would be displayed if the entire segmented transparent LCD were covered with display segments and were not spaced apart with transparent regions therebetween. In another example, the display image can be configured such that the display segments collectively display the entirety of the display image. In another example, each display segment displays its own display image so that the "display-image segment" can be actually considered its own display image. For ease of discussion, display segments are said to form a display-image segment even though the display segments may each display its own display image that is not part of a larger display image.

Some of the Figures below show an exemplary segmented transparent LCD display face on and do not include a display image on the display segments for ease of illustration. FIGS. 11C and 12C illustrate examples of segmented transparent LCD displays that include display-image segments being displayed by the display segments.

Limits on ranges or values in the form of "between A and B" are considered herein to be inclusive of A and B.

Figure 1:
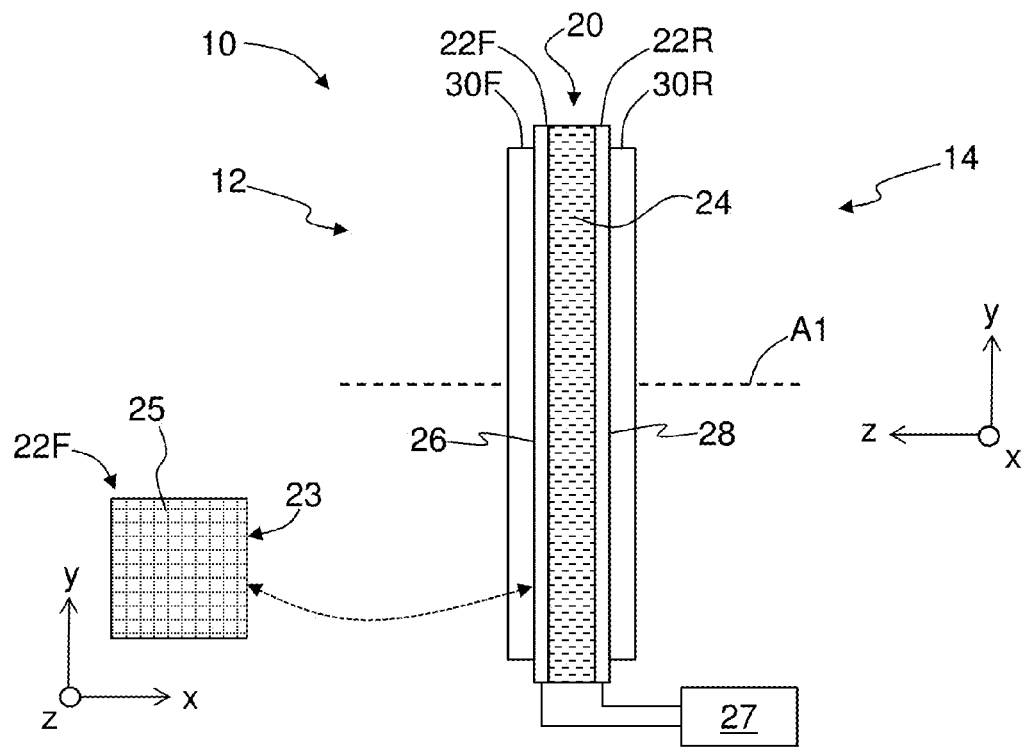
FIGS. 1 through 8B are side views of an example LCD structure and illustrate an example series of steps used to form a segmented transparent LCD with localized backlighting according to the disclosure.

FIGS. 1 through 8B illustrate an example series of steps used to form a segmented transparent LCD with localized backlighting ("segmented transparent LCD") 100 according to the disclosure. FIG. 1 is a cross-sectional view of an example LCD structure 10 that may be used to form segmented transparent LCD 100 (see, e.g., FIGS. 8A, 8B, 9A and 9B as introduced and described below). The LCD structure 10 of FIG. 1 has a front side 12, a rear side 14, and a viewing axis A1 that runs in the z-direction and is thus generally perpendicular to a long dimension of the LCD structure.

The LCD structure 10 of FIG. 1 includes an LC module 20 having front and rear glass sheets 22F and 22R that sandwich an LC material 24. The glass sheets 22F and 22R respectively define front and rear sides 26 and 28 of LC module 20. The glass sheets 22F and 22R each include a transparent electrode array 23 that define image pixels 25, as shown in the close-up inset of FIG. 1 and as is known in the art of LCD modules. A control electronics unit 27 is electrically connected to the transparent electrode arrays 23 and provides electrical signals (e.g., voltages) to selectively activate image pixels 25 in the process of forming a display image.

The LCD structure 10 includes front and rear polarizers 30F and 30R that sandwich LC module 20.

In subsequent Figures, the glass sheets 22F, 22R, the LC material 24 and control electronics unit 27 are omitted for ease of illustration.

Figure 2:
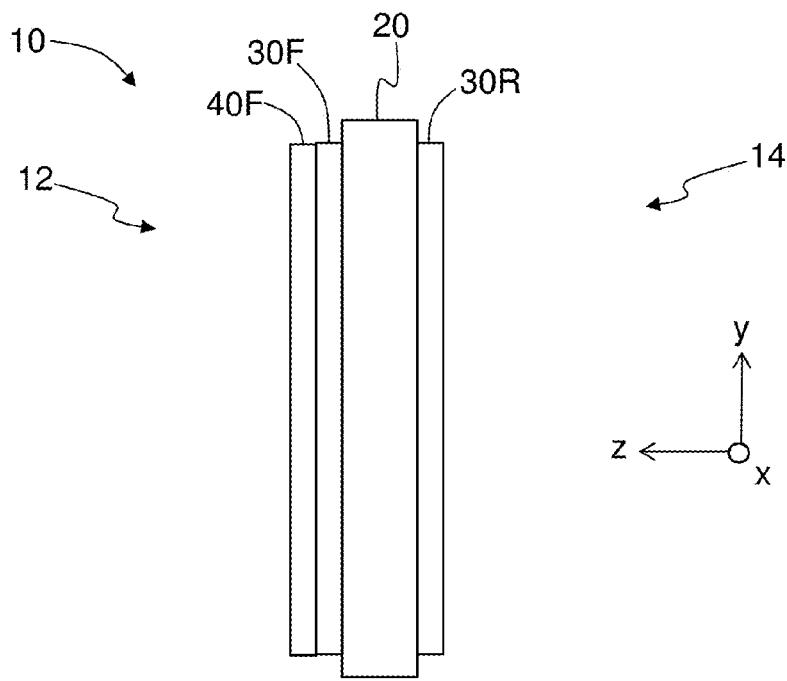

FIG. 2 is similar to FIG. 1 and shows LCD structure 10 as further including a protective film 40F on front polarizer 30F in anticipation of processing the front polarizer in a subsequent step explained below. Example materials for protective film 40F include polyester-based films, such as available from Nitto Denko, Osaka, Japan. In an example, protective film 40F can include an adhesive, e.g. a polyurethane adhesive.

Figure 3:
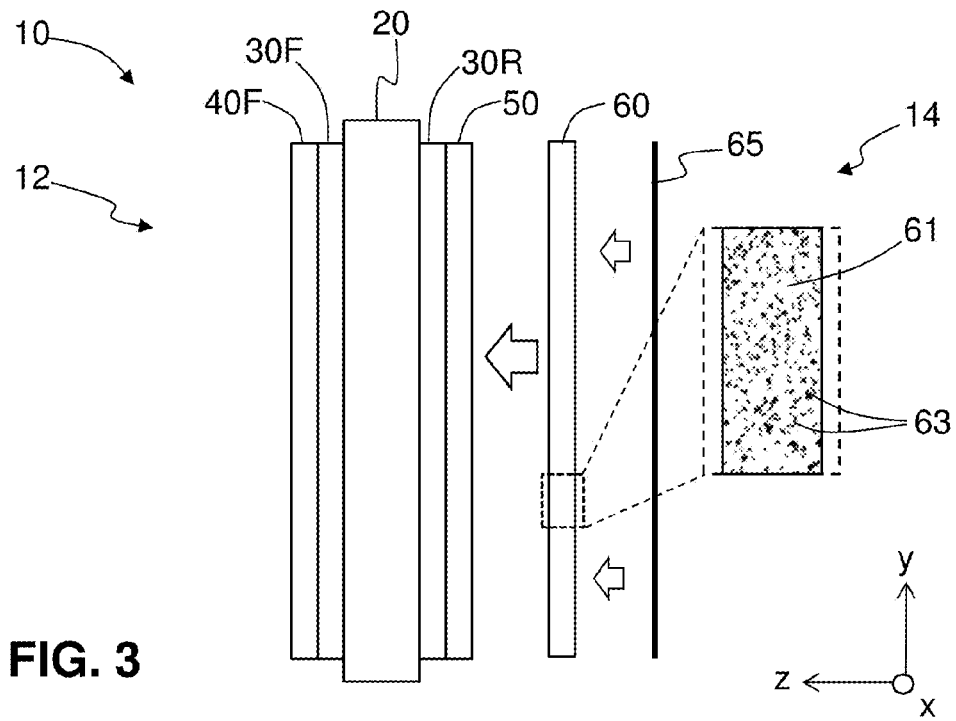

FIG. 3 is similar to FIG. 2 and shows LCD structure 10 as further including a layer of optically clear adhesive (OCA) 50 on the backside of rear polarizer 30R. FIG. 3 also shows a light-redirecting layer 60 in the process of being added to OCA layer 50. In an example, light-redirecting layer 60 has a body 61 that includes internal light-redirecting features 63, as shown in the close-up inset. Example internal light-redirect features include voids, refractive index variations, and particles that diffuse or scatter light.

In an example, the light-redirection provided by the light-redirecting layer 60 has a non-specular component, i.e., is not a specular reflector only. For example, light-redirecting layer 60 can provide the light-redirection by light scattering, light diffusion, or a combination thereof. In addition, the light-redirecting layer 60 can also provide a portion of the light-redirection via specular reflection. Thus, reference to the light-redirecting layer 60 (and light-redirecting segments 60S, discussed below) as being "non-specular" does not mean that the light redirection layer or segment cannot have a portion (e.g., up to 25% or even up to 50%) of the light redirecting being based on specular reflection. Some non-limiting examples of materials that may be used to form light-redirecting layer 60 include one or more of a textured acrylic sheet, a diffusion film, or a frosted film, among others.

Figure 4:
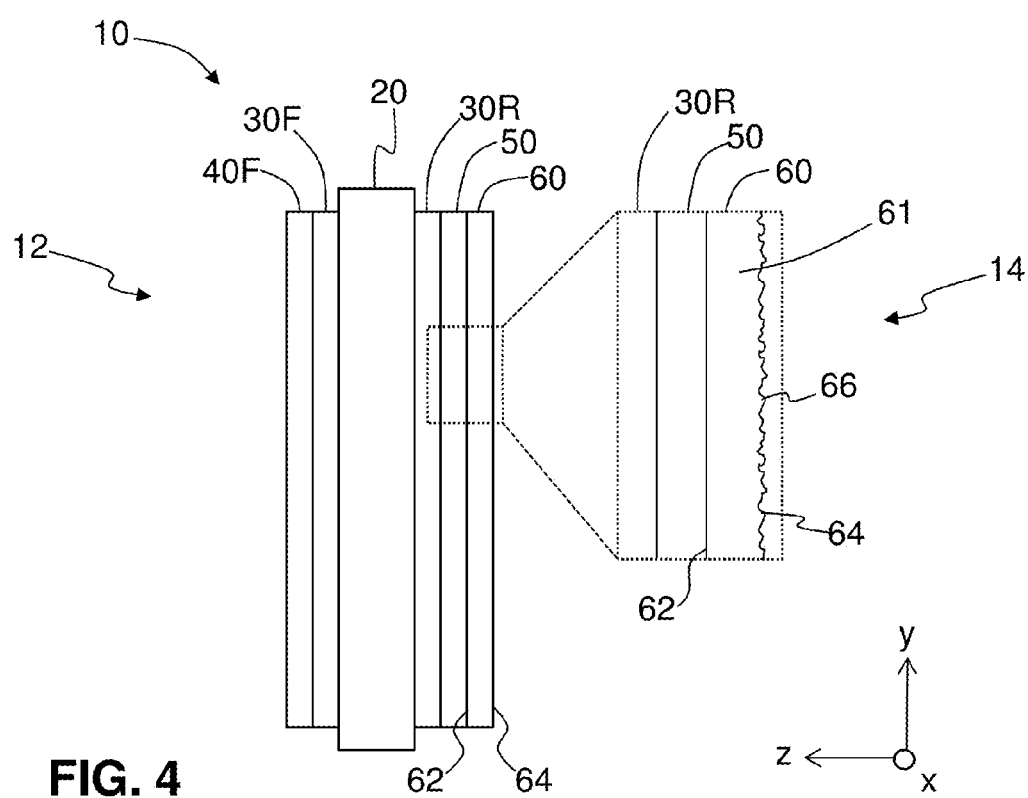

FIG. 4 is similar to FIG. 3 and shows the light-redirecting layer 60 in place in LCD structure 10 by operation of OCA layer 50. FIG. 4 also shows another example of light-redirecting layer 60 with front and rear sides 62 and 64, with the front side being substantially smooth and the rear side 64 having surface light-redirecting features 66, such as surface variations (e.g., surface roughness) designed to non-specularly redirect visible-wavelength light. In another example, light-redirecting layer 60 can have both internal light-redirecting features 63 as well as surface light-redirecting features 66. In an example, light-redirecting layer 60 can support an optional reflective layer 65 on rear side 64, as shown in FIG. 3

Figure 5:
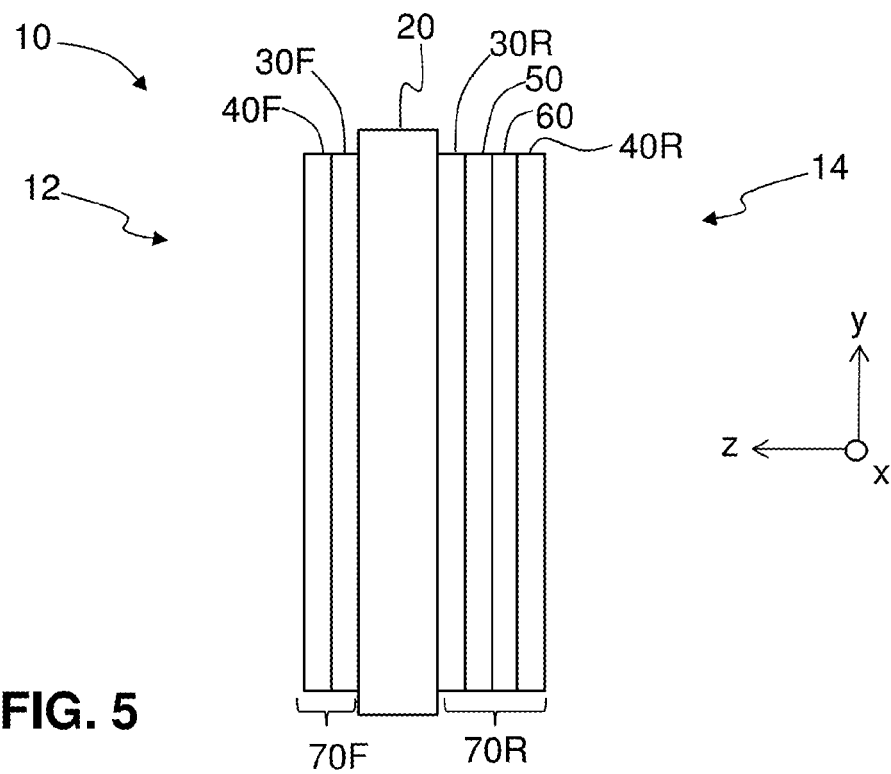

FIG. 5 is similar to FIG. 4 and shows LCD structure 10 as having a rear protective film 40R disposed on light-redirecting layer 60 at rear surface 64. The rear protective film 40R can be the same type of protective film as front protective film 40F. At this point in the process, LCD structure 10 includes a front layer stack 70F that includes front polarizer 30F and front protective layer 40F, and a rear layer stack 70R that includes rear polarizer 30R, OCA layer 50, light-redirecting layer 60, the optional reflective layer 15 (not shown) and rear protective layer 40R.

Figure 6:
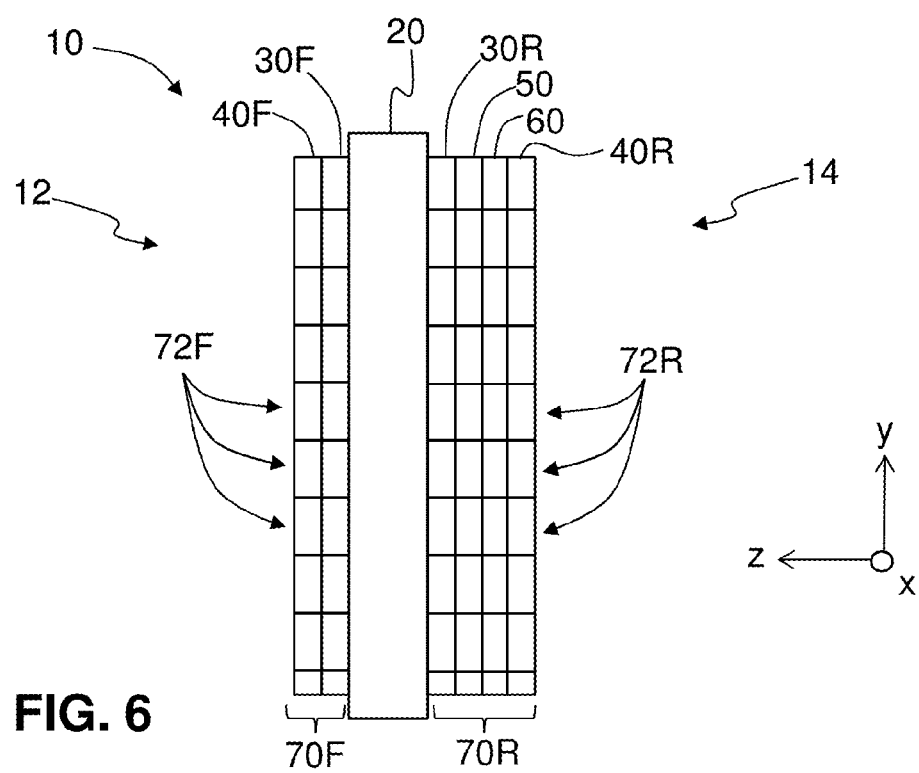

FIG. 6 is similar to FIG. 5 and shows the front layer stack 70F and the rear layer stack 70R as being scored down to LC module 20 in various places to define segments 72F in the front layer stack and segments 72R the rear layer stack. In an example, each front segment 72F is substantially aligned in the z-direction with a corresponding rear segment 72R and has substantially the same size.

Figure 7:
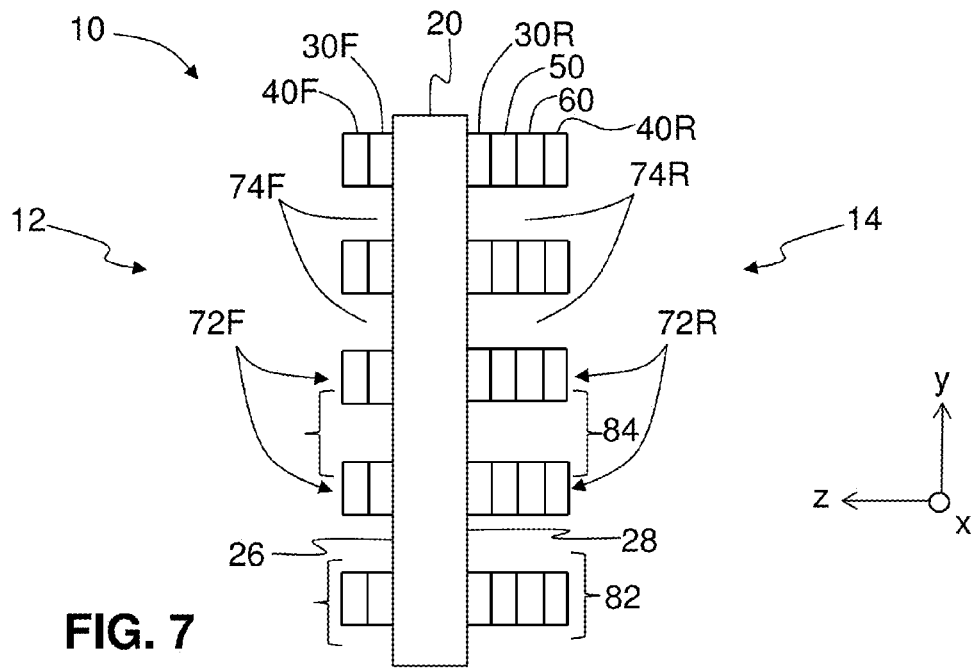

FIG. 7 is similar to FIG. 6 and shows select front segments 72F and the correspondingly aligned rear segments 72R removed, leaving behind respective front and rear spaces 74F and 74R that go all the way down to LC module 20 at the front and rear sides 26 and 28 thereof, respectively.

Figure 8A:
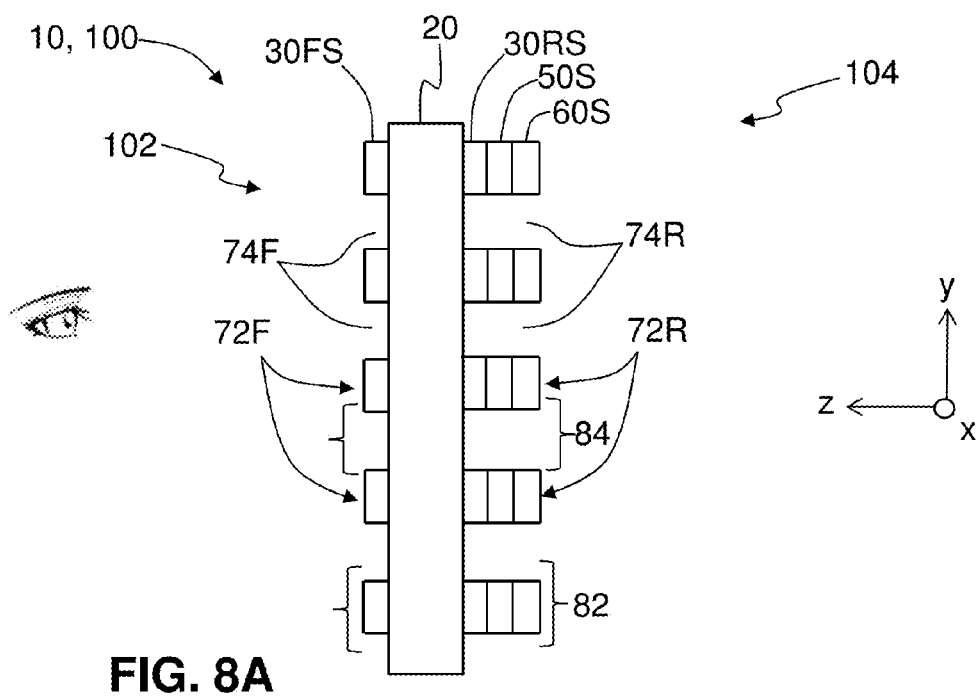
Figure 8B:
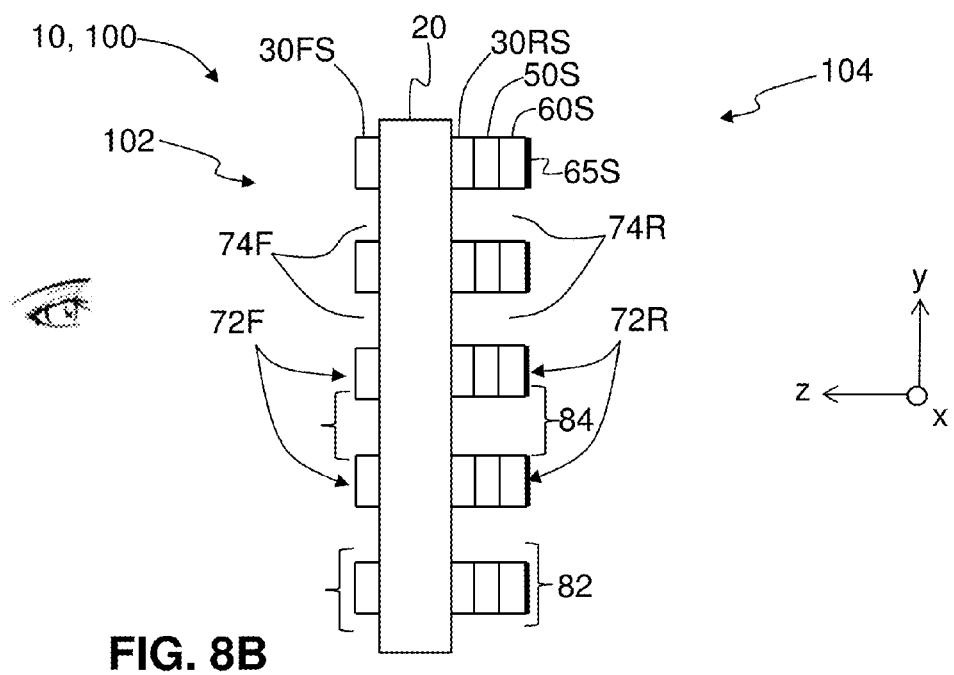

FIG. 8A is similar to FIG. 7 and shows the LCD structure 10 with the front and rear protective films 40F and 40B removed from the remaining front and rear segments 72F and 72R, thereby arriving at an exemplary segmented transparent LCD 100, which has a front side 102 and a rear side 104. Each remaining front segment 72F includes a segment 30FS of front polarizer 30F. Each remaining rear segment 72R includes a segment 30RS of rear polarizer 30R, a segment 50S of the OCA layer, and a light-redirecting segment 60S of light-redirecting layer 60. FIG. 8B is similar to FIG. 8A but includes a reflective layer segment 65S in rear segments 72R. The reflective layer segments 65S can serve to increase the amount of available localized backlight, as discussed below.

The combination of front segment 72F, the corresponding and axially aligned rear segment 72R and the intervening portion of LC module 20 define a display segment 82. Thus, the segmented transparent LCD 100 is made up of an array of display segments 82, while the remaining portions of segmented transparent LCD define at least one transparent region 84.

Figure 9A:
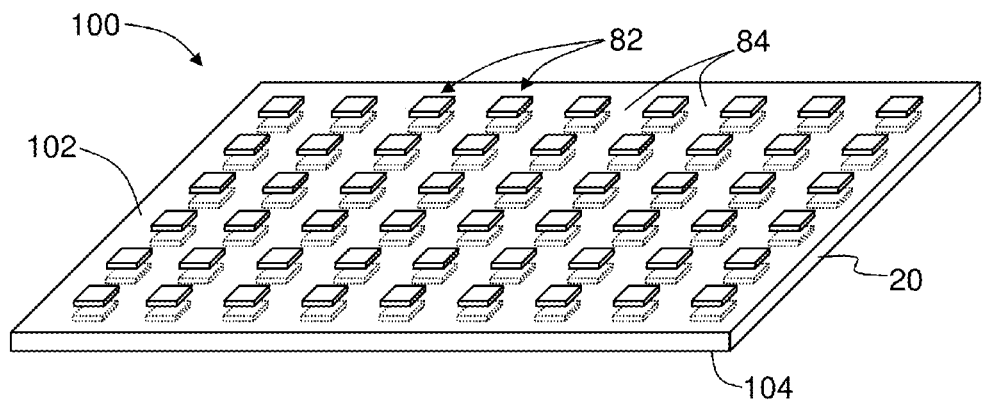
FIG. 9A is a front elevated view of an example segmented transparent LCD wherein the display segments are rectangular and evenly distributed as islands over the LC module, and the segmented transparent LCD includes a single contiguous transparent region.

FIG. 9A is a front elevated view of an example segmented transparent LCD 100, wherein the display segments 82 are rectangular and evenly distributed as islands over the LC module 20 such that the segmented transparent LCD includes a single contiguous grid-like transparent region 84.

Figure 9B:
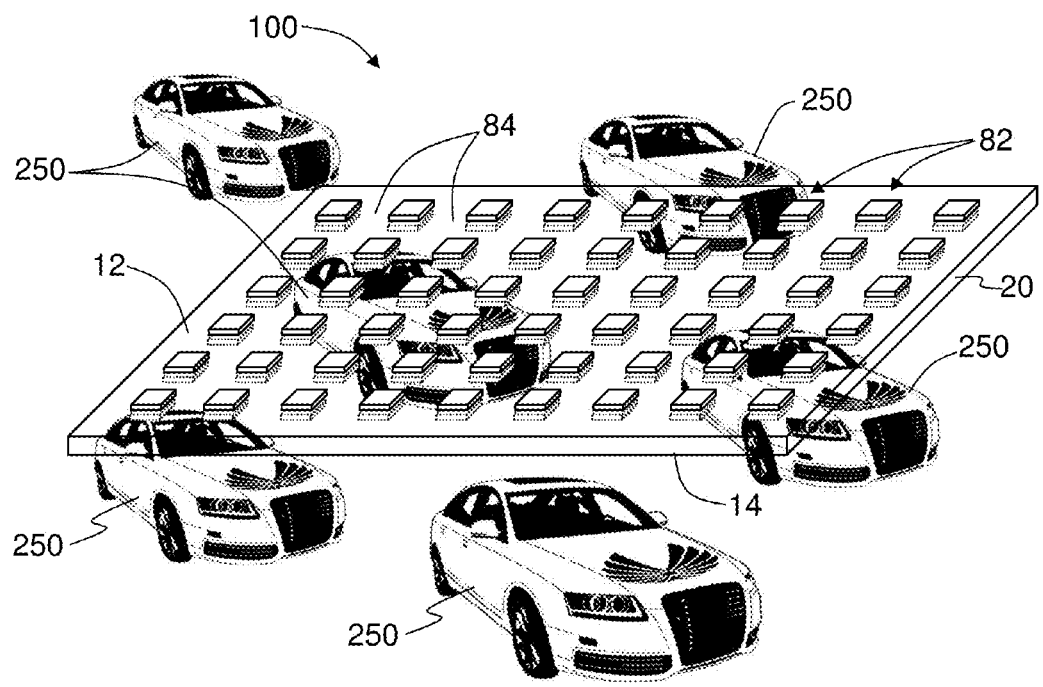
FIG. 9B is the same as FIG. 9B, and further shows example objects in the form of cars in the space behind the segmented transparent LCD to illustrate how the transparent region allows a viewer to see through a portion of segmented transparent LCD while also being able to view a display image via the display elements.

FIG. 9B is similar to FIG. 9A and includes example objects 250 in the form of cars in the space behind the segmented transparent LCD 100. FIG. 9B illustrates how the transparent region 84 allows a viewer to see through a portion of segmented transparent LCD 100 while also being able to view a display image via display elements 82. The number of separate and non-contiguous transparent regions 84 can vary, depending on the configuration and size of display segments 82. In an example, display segments 82 are configured as shown in FIGS. 9A and 9B as islands within one contiguous transparent region 84. The segmented transparent LCD 100 can have other configurations of display segments 84 with different shapes and sizes and with multiple separate transparent regions 84 (see, e.g., FIGS. 14A and 14B, introduced and discussed below).

Each of the display segments 82 can include multiple image pixels 25. In an example, the display segments 82 each have between about 64 and about 16,000 total LCD image pixels. In another example, display segments 82 are rectangular with at least one dimension in the range from about 1 mm to about 50 mm. In an example, the display segments 82 all have the same number of LCD image pixels 25, while in another example the display segments all have the same size. In other examples, the display segments 82 can have a variety of different sizes and shapes.

Figure 10:
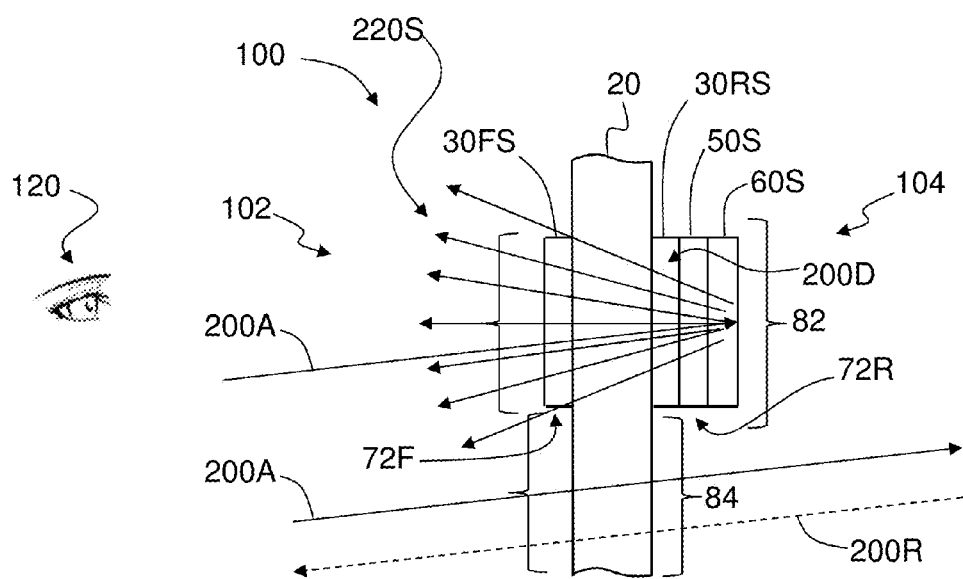
FIG. 10 is a close-up cut-away side view of a portion of segmented transparent LCD showing a single display segment and showing how the ambient light is converted to localized backlight by the display segment, and how the localized backlight is used in the display segment to form a display-image segment.

FIG. 10 is a close-up cut-away side view of a portion of segmented transparent LCD 100 showing a single display segment 82. An observer 120 is viewing the segmented transparent LCD 100 by looking at it from the front side 102. Ambient light 200A enters segmented transparent LCD 100 from front side 102 and passes through display segment 82 to rear segment 72R, where it is incident upon light-redirecting segment 60S. The ambient light 200A interacts with the light-redirecting features of light-redirecting segment 60S, which creates redirected light 200D. The redirected light 200D travels back through rear segment 72R, back through LC module 20, and then back through front segment 72F and into the space where viewer 120 resides.

Meanwhile, light 200R that originates behind the segmented transparent LCD 100 (i.e., beyond the rear side 104) can pass through transparent region 84, regardless of what is happening at display segments 82. This is because the LCD module at transparent region 84 does not include front and rear polarizers 30F and 30R, and the LCD module 20 is transparent to visible light in the absence of front and rear polarizers 30F and 30R. Light 200R, which is referred to hereinafter as "rear light," can be formed from ambient light 200A interacting with an object 250 that resides in the rear space defined by rear side 104 of the segmented transparent LCD 100 (see FIG. 9B). The rear light 200R can also originate from the object 250 or in the space in which the object resides.

The aforementioned redirected light 200D generated by display segment 82 travels over a relatively wide range of angles and serves as localized backlight for the display segment. Redirected light 200D is thus referred hereinafter as "localized backlight." Here, the backlight is said to be "localized" because it operates to provide backlight mainly if not exclusively for the display segment 82 in which the backlight is generated. As noted above, in some embodiments, the use of reflective segments 65S (FIG. 8B) can enhance the amount of localized backlight 200D.

Figure 11A:
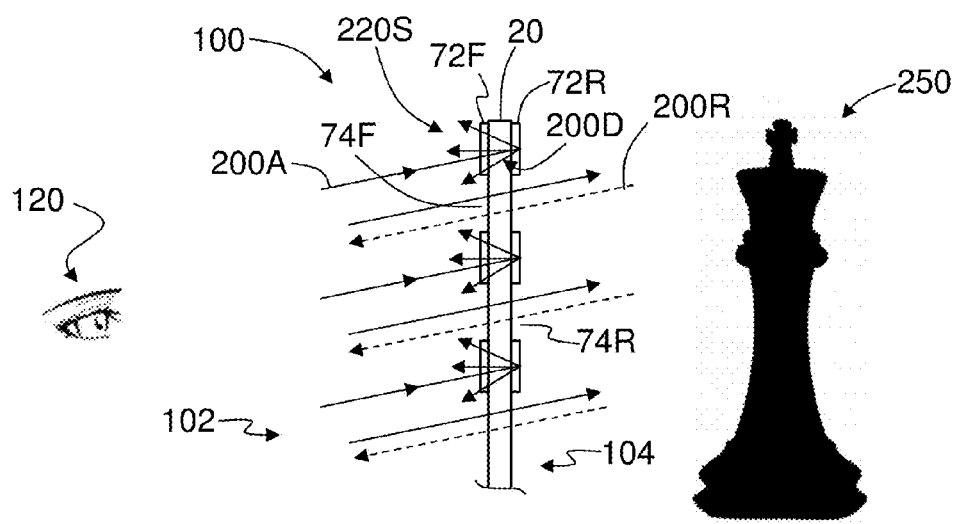
FIG. 11A is a close-up side view of a segmented transparent LCD showing a few display segments and an object in the space behind the segmented transparent LCD.
Figure 11B:
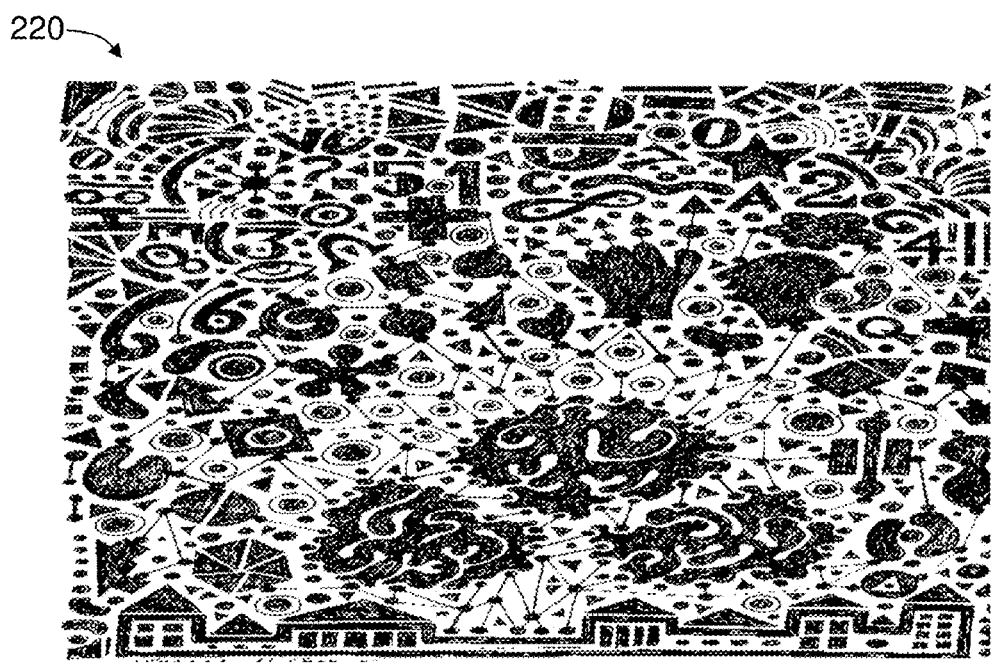
FIG. 11B is an example display image shown in its entirety, i.e., in an unsegmented form.
Figure 11C:
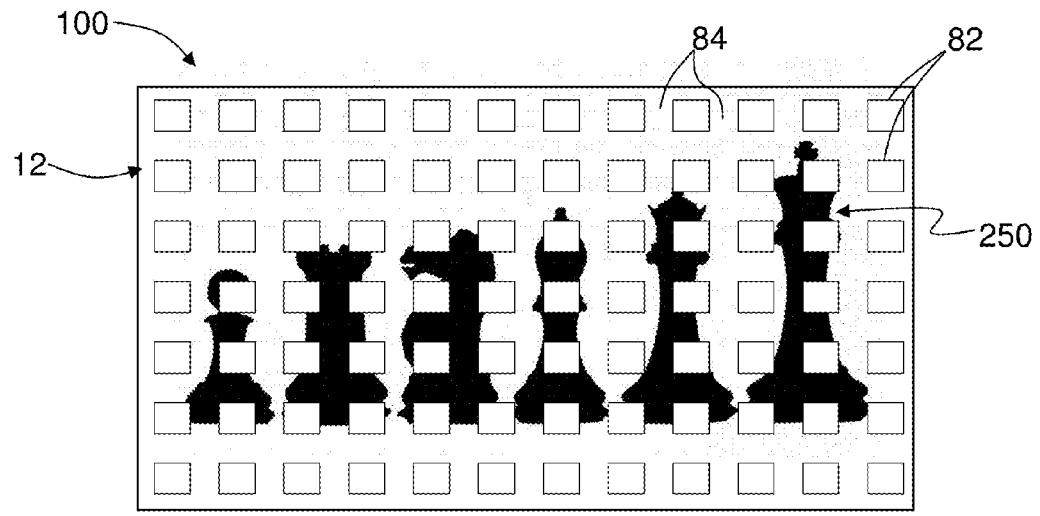
FIG. 11C is a front-on view of a segmented transparent LCD and an object behind the segmented transparent LCD as seen by a viewer, without a display image being displayed by the display segments.

As shown in FIGS. 11A and 11B, in one example, each display element 82 emits ("displays") a display-image segment 220S of a larger display image 220 (see FIG. 11B). This is accomplished by electrically addressing the image pixels 25 in display element 82. The display image segment 220S displayed by display element 82 varies in size, depending on the size of the display element.

FIG. 11A is a close-up side view of segmented transparent LCD 100 showing a few display segments 82 and an object 250 in the space behind the segmented transparent LCD. The object 250 is in the form of a row of chess pieces that extend into the page (only the king is seen in the side view). FIG. 11B is an example of a display image 220 shown in its entirety, i.e., in non-segmented form.

Figure 11D:
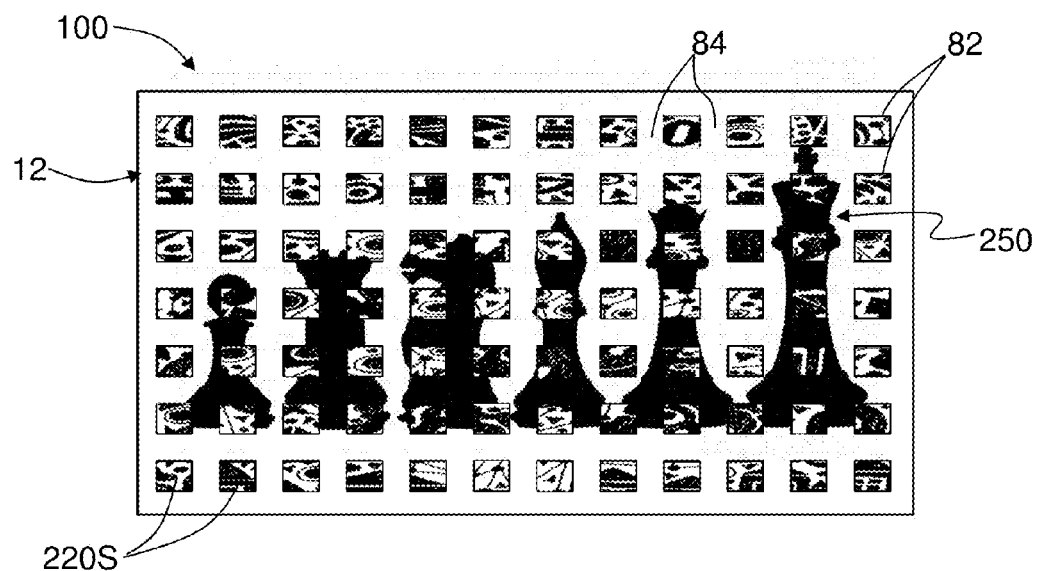
FIG. 11D shows the segmented transparent LCD of FIG. 11C with display-image segments of the display image of FIG. 11B being displayed by the display segments.

FIG. 11C is a front-on view of the segmented transparent LCD 100 and the object 250 behind the segmented transparent LCD as seen by the viewer 120 and shows the row of chess pieces. FIG. 11D is the same as FIG. 11D and also shows display-image segments 220S of the display image 220 of FIG. 11B being displayed on the display segments 82.

With reference to FIG. 11A, ambient light 200A is incident upon segmented transparent LCD 100 from the front side 102. A portion of this ambient light 200A enters the various display segments 82 and is converted by the light-redirecting segments 60A therein to localized backlight 200D for the given display segment. In the meantime, rear light 200R from object 250 passes through transparent region 84 and is seen by viewer 120. Viewer 120 thus sees a portion of object 250 while also seeing display image segments 220S of a display image 220 via the display segments 82, as illustrated in FIG. 11D.

Figure 12A:
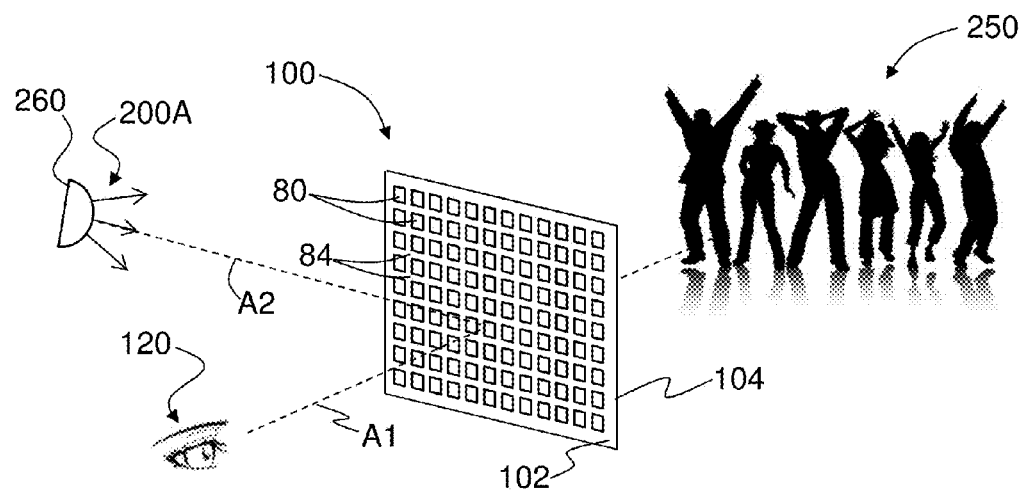
FIG. 12A is a front elevated view of a viewer viewing an object in the form of dancers through an example segmented transparent LCD along a viewing line of sight while the ambient light is provided by an off-axis light source.

FIG. 12A is a front elevated view of viewer 120 viewing an object 250 in the form of dancers through an example segmented transparent LCD 100 along the viewing axis A1 that is substantially normal to the segmented transparent LCD. The viewing axis A1 defines a straight-on line-of-sight for viewer 120. A light source 260 on the viewer side of the segmented transparent LCD is located along an illumination axis A2 that forms an oblique angle with the viewing axis A1. The illumination axis A2 thus defines an off-axis illumination direction, and light source 260 generates off-axis ambient light 200A.

Because display segments 82 include light-redirecting segments 60S that non-specularly redirect ambient light 200A to form localized backlight 200D, the source of ambient light can be localized and can be off-axis. In an example, light source 260 can be a point source or substantially a point source. In an example, multiple off-axis light sources 260 can be employed to generate the off-axis ambient light 200A.

Figure 12B:
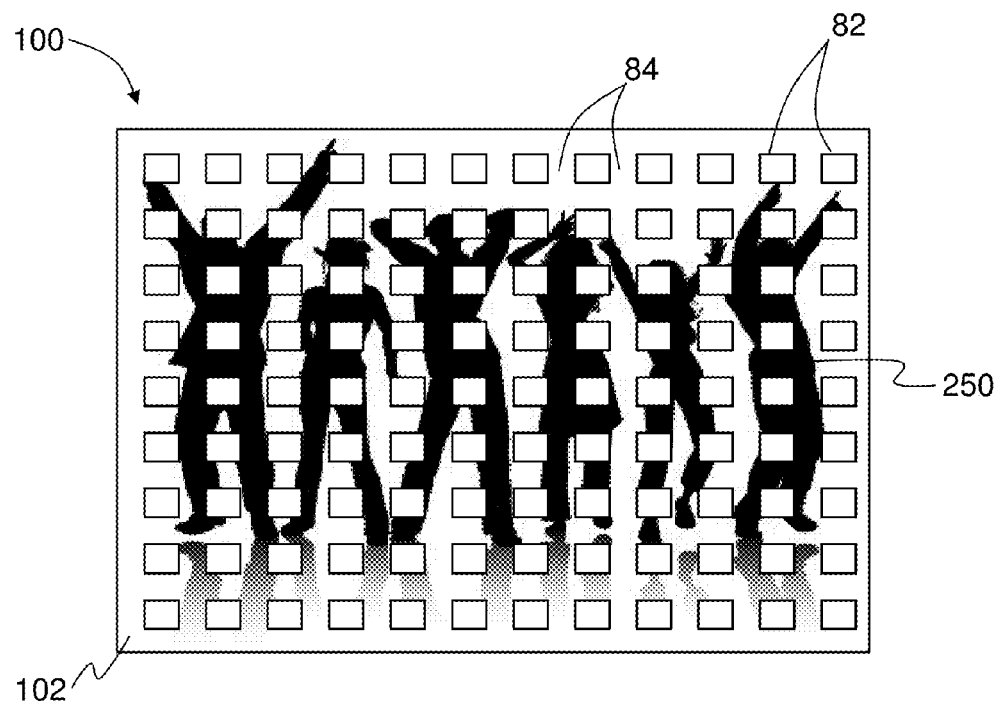
FIG. 12B is a front-on view of the segmented transparent LCD of FIG. 12A as seen by the viewer in FIG. 12A without a display image being displayed by the display segments.
Figure 12C:
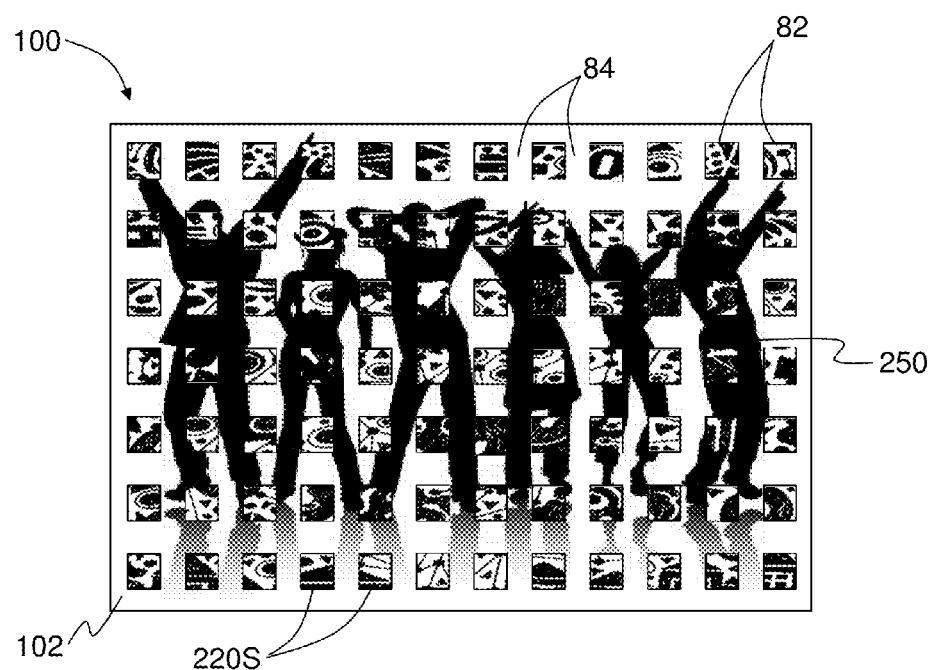
FIG. 12C shows the is the segmented transparent LCD of FIGS. 12A and 12B with the display image of FIG. 11B being displayed in segmented form by the display segments.

FIG. 12B is a front-on view of segmented transparent LCD 100 and the object 250 as seen by viewer 120. FIG. 12C is the same as FIG. 12B and also shows the display image 220 of FIG. 11B being displayed using the display segments 82. The display segments 82 each include a display-image segment 220S of a larger display image 220 so that the viewer 120 sees both a portion of the object 250 behind segmented transparent LCD 100 as well display image 220 (or portions thereof).

Figure 13A:
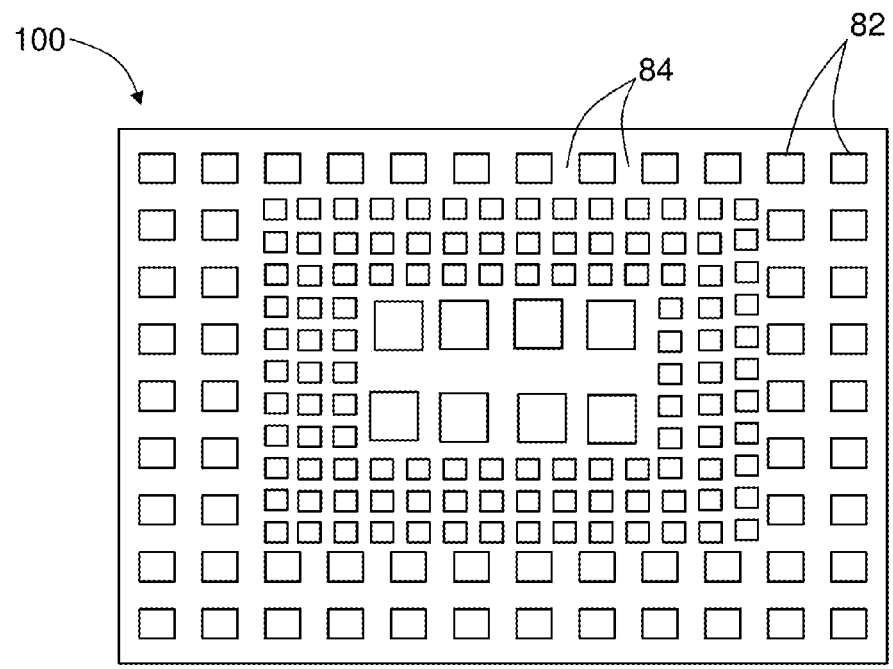
FIG. 13A shows an example segmented transparent LCD, wherein the display segments are not all of the same size.
Figure 13B:
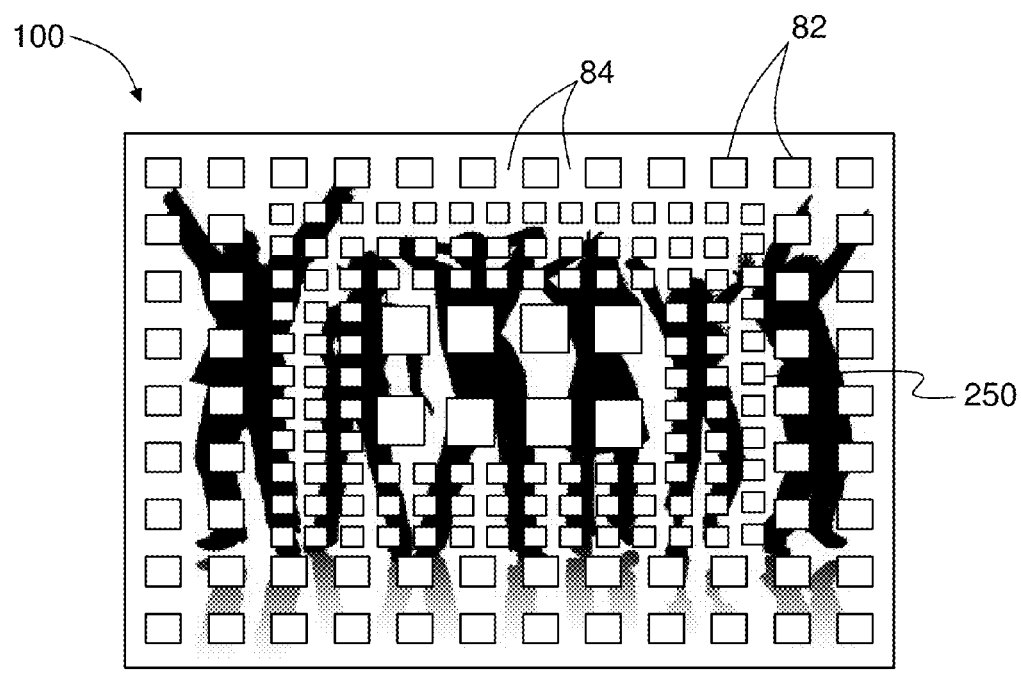
FIG. 13B shows the segmented transparent LCD of FIG. 13A including the object of FIG. 12A as seen through the segmented transparent LCD.

FIG. 13A is similar to FIG. 12A and illustrates an example of segmented transparent LCD 100 wherein the display segments 82 are not all of the same size. In the example shown, the display segments 82 at the center of the segmented transparent LCD 100 are relatively large, the ones near the outer edges are of intermediate size, and the ones midway in between are the smallest. FIG. 13B is similar to FIG. 13A but shows the object of FIG. 12A seen through the segmented transparent LCD 10.

Figure 14A:
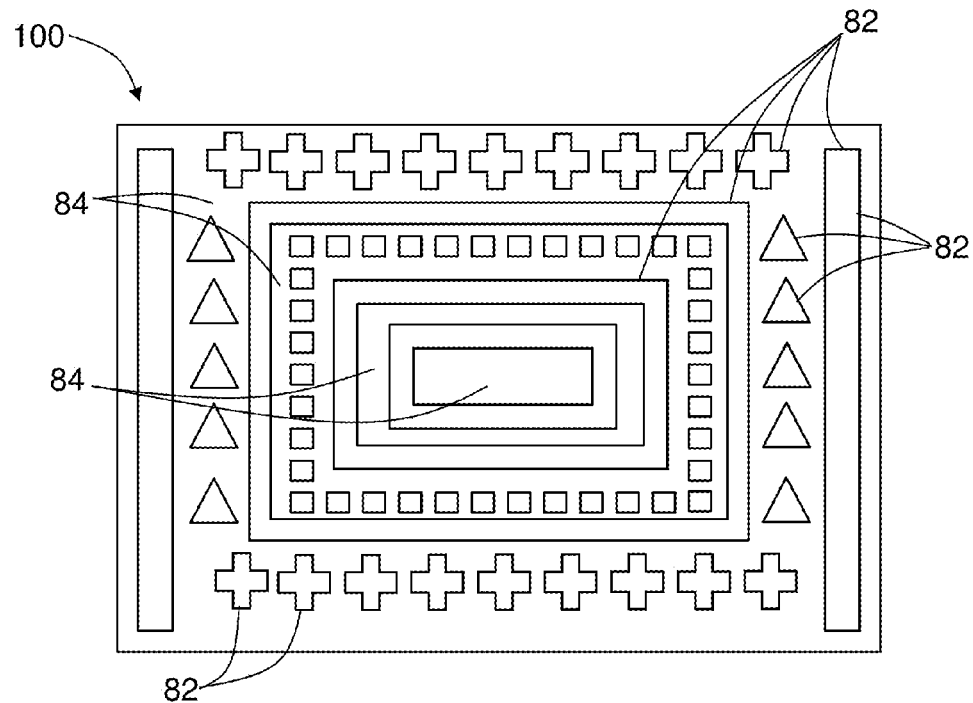
FIG. 14A shows an example segmented transparent LCD wherein some of the display segments have different shapes, and wherein there are multiple transparent regions.
Figure 14B:
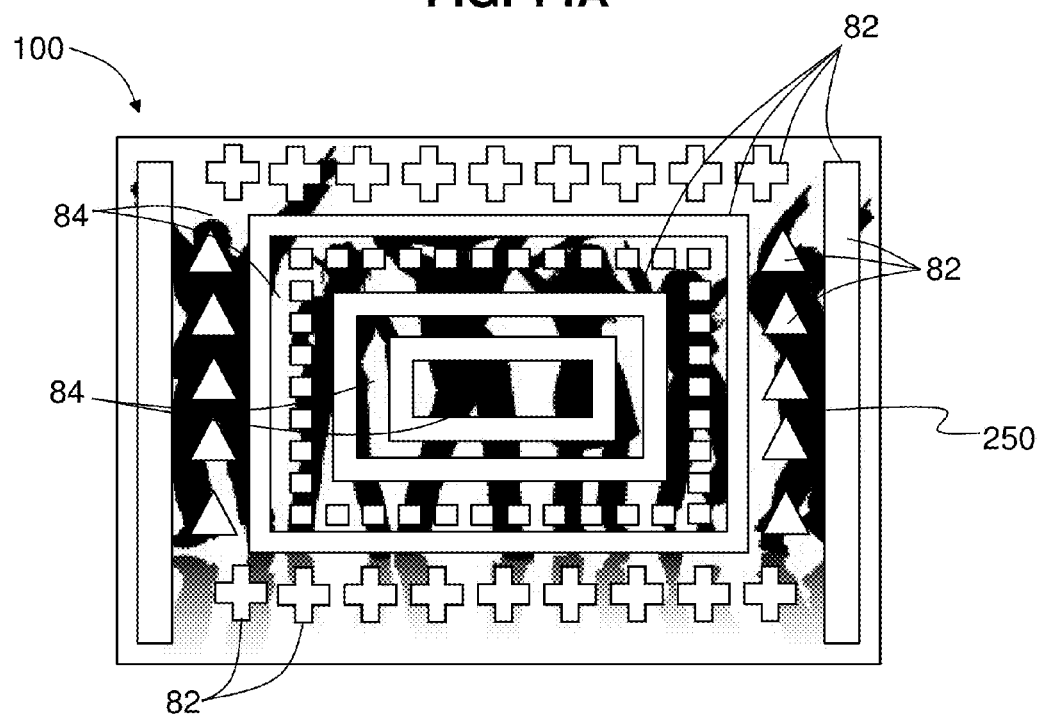
FIG. 14B shows the segmented transparent LCD FIG. 14A with the object of FIG. 12A as seen through the segmented transparent LCD.

FIG. 14A is similar to FIG. 13A and illustrates an example of segmented transparent LCD 100 wherein the display segments 82 have different shapes. Some of the display segments 82 are configured such that there are multiple transparent regions 84, i.e., there is not one contiguous transparent region. In the example shown, the display segments 82 near the center of the segmented transparent LCD 100 are formed as large rectangular rings that close off the transparent regions 84 therein from the other transparent regions. FIG. 14B is similar to FIG. 13B and shows the object 250 of FIG. 12A as seen through the segmented transparent LCD 10.

The segmented transparent LCD 100 disclosed herein has a number of advantages. One advantage is that it enables point source and indirect, e.g., off-axis ambient lighting to provide localized backlighting for display segments 82. In addition, the transparency of the transparent regions 84 is relatively high and substantially equal to that of an LC module since in an example the transparent regions consist only of sections of the LCD module 20. Another advantage is that the segmented transparent LCD display 100 allows for greater visibility and ease of viewing of an object or scene through the segmented transparent LCD display while also allowing for at least a portion of display image 220 to be viewed.

Segmented transparent LCD 100 also provides good two-way visibility through the segmented transparent LCD due to the high transparency of the transparent regions 84. In addition, a control electronics unit for segmented transparent LCD 100 can be essentially the same as a control electronics unit for a conventional LCD in the case where the display segments 82 are used to display respective display-image segments 220S of a larger display image 220, with gaps in the display image being formed by the one or more transparent regions 84.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A segmented liquid crystal display (LCD) that employs ambient light for displaying a display image, comprising:
    a liquid crystal (LC) module having front and rear sides and being substantially transparent to visible light; and
    an array of spaced apart display segments supported by the LC module and separated by one or more transparent regions, wherein each display segment is configured to display a segment of the display image and having a light-redirecting segment configured to provide localized backlight to the display segment when the ambient light is incident thereon, wherein the one or more transparent regions include portions of the LC module and are configured to provide gaps in the display image where the display image is not formed;
    wherein each display segment includes aligned front-side and rear-side polarizer segments respectively disposed on the front side and rear side of the LC module.

2. The segmented transparent LCD according to claim 1, wherein each display segment has a dimension in the range from 1 mm to 50 mm.

3. The segmented transparent LCD according to claim 1, wherein the display segments all have substantially the same dimensions.

4. The segmented transparent LCD according to claim 1, wherein the LC module defines image pixels, and wherein each display segment includes between 64 image pixels and 16,000 image pixels.

5. The segmented transparent LCD according to claim 1, wherein the light-redirecting segment is a non-specular light-redirecting segment that includes at least one of surface light-redirecting features and internal light-redirecting features.

6. The segmented transparent LCD according to claim 5, wherein the surface light-redirecting features are defined by an amount of surface roughness.

7. The segmented transparent LCD according to claim 1, wherein the display segments each include a light-reflecting segment cooperatively arranged with the light-redirecting segment.

8. The segmented transparent LCD according to claim 1, wherein the display segments are substantially uniformly spaced apart.

9. The segmented transparent LCD according to claim 1, wherein the display segments have a rectangular shape.

10. The segmented transparent LCD according to claim 1, wherein the light-redirecting segment is adjacent the rear-side polarizer segment.

11. The segmented transparent LCD according to claim 7, wherein the light-reflecting segment is on a backside of the light-redirecting segment.

12. The segmented transparent LCD according to claim 10, wherein the light-redirecting segment is secured to the rear polarizer segment with an optically clear adhesive.

13. The segmented transparent LCD according to claim 10, wherein the display segments are formed as islands within a single contiguous transparent region.

14. A method of displaying a display image, comprising:
providing a segmented liquid crystal display (LCD) that includes an LC module and a plurality of display segments arranged on the LC module, the plurality of display segments separated by one or more transparent regions where the display image is not displayed, wherein the transparent regions include portions of the LC module, the LC module including a front side and an opposing rear side, each of the plurality of display segments including a first portion positioned on the front side of the LC module and a second portion positioned on the rear side of the LC module, wherein each of the display segments is configured to provide localized backlighting and to display a corresponding segment of the display image;
illuminating the segmented LCD with ambient light; and
converting a portion of the ambient light into the localized backlighting in each of the display segments, thereby forming on each display segment the corresponding segment of a display image.

15. The method according to claim 14, wherein the step of illuminating includes providing the ambient light from at least one off-axis direction with respect to the segmented transparent LCD.

16. The method according to claim 14, wherein each display segment includes a non-specular light-redirecting segment, further wherein the converting step includes non-specularly redirecting the ambient light to form the localized backlighting.

17. The method according to claim 14, wherein the providing step includes providing a segmented LCD having display segments wherein the display segments have the same size.

18. The method according to claim 17, wherein the providing step includes providing a segmented LCD having display segments wherein the display segments are equally spaced apart from one another.

19. The method according to claim 14, further including viewing an object through the one or more transparent regions while viewing the segmented transparent LCD.

20. The method according to claim 14, wherein the converting step is performed so that the display-image segments collectively form the entirety of the display image.

21. The method according to claim 14, wherein the converting step is performed so that the display-image segments collectively form a portion of the entirety of the display image.

22. The segmented transparent LCD according to claim 1, wherein each of the display segments include a polarizer segment separated by the one or more transparent regions.

23. The segmented transparent LCD according to claim 1, wherein the transparent regions do not include two or more polarizers.

24. The segmented transparent LCD according to claim 1, wherein the transparent regions do not include a polarizer.

25. The segmented transparent LCD according to claim 1, wherein the transparent regions do not include a light-redirecting segment.

26. The method according to claim 14, wherein each of the display segments include a polarizer segment separated by the one or more transparent regions.

27. The method according to claim 14, wherein the transparent regions do not include two or more polarizers.

28. The method according to claim 14, wherein the transparent regions do not include a polarizer.

29. The method according to claim 14, wherein the transparent regions do not include a light-redirecting segment.

30. The method according to claim 14, wherein the first portion includes a front polarizer and the second portion includes a rear polarizer.

* * * * *